(12) United States Patent
Bergen (10) Patent No.: US 11,106,936 B2
(45) Date of Patent: Aug. 31, 2021

(54) OBJECT POINT CLOUD COMPARISON AND MATCHING

(71) Applicant: General Atomics, San Diego, CA (US)

(72) Inventor: Zachary Bergen, Louisville, CO (US)

(73) Assignee: General Atomics, San Diego, CA (US)

( * ) Notice: Subject to any disclaimer, the term of this patent is extended or adjusted under 35 U.S.C. 154(b) by 96 days.

(21) Appl. No.: 16/561,403

(22) Filed: Sep. 5, 2019

(65) Prior Publication Data

US 2021/0073571 A1 Mar. 11, 2021

(51) Int. Cl.
*G06K 9/62* (2006.01)
*G06K 9/00* (2006.01)

(52) U.S. Cl.
CPC ....... *G06K 9/6202* (2013.01); *G06K 9/00201* (2013.01); *G06K 9/6215* (2013.01)

(58) Field of Classification Search
CPC . G06K 9/6202; G06K 9/00201; G06K 9/6215
USPC ........................................................ 382/201
See application file for complete search history.

(56) References Cited

U.S. PATENT DOCUMENTS

| | | | |
|---|---|---|---|
| 5,394,151 A | 2/1995 | Knaell | |
| 5,677,693 A | 10/1997 | Frankot | |
| 6,864,828 B1 | 3/2005 | Golubiewski | |
| 7,046,841 B1 | 5/2006 | Dow | |
| 7,710,561 B2 | 5/2010 | Roth | |
| 8,275,547 B2 | 9/2012 | Rousselle | |
| 8,344,934 B2 | 1/2013 | Ryland | |
| 9,417,323 B2 | 8/2016 | Carande | |
| 2019/0205695 A1* | 7/2019 | Yan | G06K 9/6215 |
| 2020/0273211 A1* | 8/2020 | Kato | G06T 9/40 |

FOREIGN PATENT DOCUMENTS

| | | | | |
|---|---|---|---|---|
| CN | 105844602 A | * | 8/2016 | |
| CN | 109903319 A | * | 6/2019 | |
| WO | WO-2020154964 A1 | * | 8/2020 | G01S 17/931 |

OTHER PUBLICATIONS

Vlaminck, M., Luong H., and Philips, W., "Multi-resolution ICP for the efficient registration of point clouds based on octrees," 2017 Fifteenth IAPR International Conference on Machine Vision Applications (MVA), Nagoya, Japan, 2017, pp. 334-337, doi: 10.23919/MVA.2017.7986869. (Year: 2017).*

* cited by examiner

*Primary Examiner* — Nancy Bitar
*Assistant Examiner* — Daniella M. DiGuglielmo
(74) *Attorney, Agent, or Firm* — Fitch, Even, Tabin & Flannery LLP (57) ABSTRACT

Point clouds of objects are compared and matched using logical arrays based on the point clouds. The point clouds are azimuth aligned and translation aligned. The point clouds are converted into logical arrays for ease of processing. Then the logical arrays are compared (e.g. using the AND function and counting matches between the two logical arrays). The comparison is done at various quantization levels to determine which quantization level is likely to give the best object comparison result. Then the object comparison is made. More than two objects may be compared and the best match found.

18 Claims, 10 Drawing Sheets

|   | 1 | 2 | 3 | 4 |
|---|---|---|---|---|
| 4 | false | true | true | false |
| 3 | true | true | true | true |
| 2 | true | true | true | true |
| 1 | false | true | true | false |

OBJECT POINT CLOUD COMPARISON AND MATCHING

BACKGROUND OF THE INVENTION

U.S. Pat. No. 9,417,323, issued Aug. 16, 2016 is incorporated herein by reference.

Field of the Invention

The present invention relates to comparing and matching point clouds for two or more objects.

Discussion of Related Art

The advent of LIDAR and other methods of generating remotely-sensed 3D point representations of scenes and objects necessitates techniques for exploitation algorithms. The large data problem and unique aspects of how 3D point clouds are generated require new ways of investigation involving computational speed and size reduction without loss of information (or at least with an acceptable loss depending on the resolution required). Currently, most point cloud comparison/matching algorithms are computer vision-based approaches. These techniques work on object surface features.

A need remains in the art for apparatus and methods for comparing and matching point clouds of objects in a simpler and equally powerful way using simpler data structures such as logical arrays. An example of the complexity of current approaches is given in the Wikipedia article entitled "Marching cubes."

There exist programming libraries for manipulating and representing point clouds using data structures. These data structures may be used for comparison. One such library is PCL (Point Cloud Library) and is exposed as a C++ programming interface. PCL is also leveraged partially in the Python programming language as PDAL (Point cloud Data Abstraction Library). The PCL point cloud matching and alignment uses techniques such as deriving features from the point cloud data and doing alignment/matching based upon statistical distances in the feature space, data structure representations such as octrees, and ICP (Iterative Closest Point) brute force approaches. These approaches are slow and processor intensive, and work well with only certain kinds of point clouds.

For example, feature matching may be accomplished by finding surface normal vectors as a first step. To form a normal surface vector, it is necessary to have a dense neighborhood of points that represent the local surface of an object in order to have a basis for forming a planar surface to calculate the normal vector. Depending on the sensor there may or may not be enough point density in a local area to establish a meaningful normal vector. Also, the normal vector step requires knowledge of the orientation (inside or outside) or the surface. Based upon the normal vector directions localized features are derived similar to the computer vision toolkit OpenCV where a group of normal vectors is used to create some characteristic or feature. Once these features are derived the algorithms are able to use statistical distances (e.g. Mahalanobis distance) between features in one point cloud to assign a class or match to the best fit with an existing stored feature from another point cloud. PCL offers an octree decomposition of a point cloud. Comparison between two point clouds may be accomplished by forming an octree representation of each, tracing the leaf nodes of each octree and comparing the different leaf nodes. By counting the different leaf nodes, a percent difference may be obtained. The octree is a complicated data structure.

A need remains in the art for apparatus and methods for comparing and matching point clouds of objects in an efficient and general manner, using regularly spaced logical arrays. Our logic array approach gives the same spatial information with regards to the difference between two point clouds as prior art methods. We first used an octree approach and subsequently invented the logic array method to streamline, speed up, and reduce the complexity and memory requirements for comparison of point clouds.

SUMMARY OF THE INVENTION

It is an object of the present invention to provide apparatus and methods for comparing and matching point clouds of objects using logical arrays. Various embodiments include multi-resolution comparison between point clouds, voxelizing data to create the logical arrays, using the data locations (occupied voxel centers) as indices into logical arrays, and using a point cloud pyramid file format scheme. Embodiments generate a full volumetric 3D comparison technique. The present logic array approach is compact and much faster than prior art methods because the logic operation is all that is needed to form a difference array.

A process according to the present invention takes two point clouds, aligning them first angularly and then via translation, and performing a comparison resulting in statistics that may be used to describe the similarities/differences. The process compares point clouds at different resolutions so a resolution of best separability (or a sufficient separability) may be chosen. Subsequent matching may be obtained with a sufficient data quality and pre-determined quantization level.

Methods and apparatus for comparing point cloud data for two objects start with selecting a first analog point cloud representing a first object and a second analog point cloud representing a second object. The two point clouds are azimuth aligned and translation aligned. The point clouds are converted from their analog form into regularly spaced logical arrays at multiple resolutions. The logical arrays are then compared at the various resolutions and a set of comparison response values is determined. Generally, one of the response values is chosen and a comparison result is generated (e.g. the objects match or they do not match).

Using several resolutions allows comparison response curves to be plotted. This is useful because various aspects of the curves (such as inflection points and separability) are useful in choosing a particular comparison response value to get to the comparison result.

It is also useful to compare more than two objects. Additional object point clouds can all be compared to one exemplar, or they can be compared to each other to determine, e.g., which two objects are the closest match.

The logical arrays are compared using logical operations. For example, comparison response values may be obtained by performing logical AND functions between arrays and counting true results against the total of combined points.

Azimuth aligning may be performed by finding a center of gravity of each point cloud, generating weighted sums of each point cloud by determining the number of points along various angular directions from the center of gravity, generating a characteristic signature of each point cloud based upon its weighted sums, cross correlating the two characteristic signatures and choosing the angular alignment between the point clouds.

Translation aligning may be performed by offsetting the logical arrays various amounts by translating one logical array with respect to the other, performing logical AND functions between arrays and counting true results after each offset, and determining the offset that maximizes the results. Generating the logical arrays may be performed by voxelizing the point cloud and then setting each voxel containing points as "true" in a logical array.

As a feature, it is useful to quantize the point clouds at a level representing a selected spatial accuracy before azimuth aligning the point clouds. It is also useful to convert the point clouds into bump maps to simplify accounting for the mass distribution of points when generating angular statistics.

DETAILED DESCRIPTION OF THE INVENTION

Figure 1:
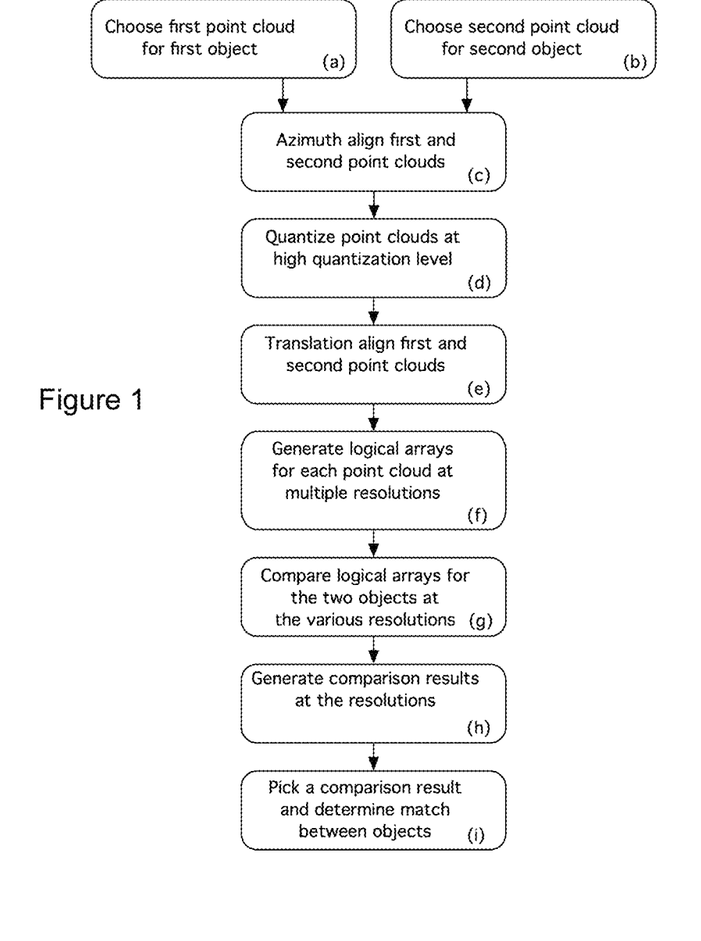
FIG. 1 is a flow diagram illustrating the steps performed in object point cloud matching according to the present invention.

FIG. 1 is a flow diagram illustrating the steps performed in object point cloud (PC) matching according to an embodiment of the present invention. At a high level the process is a way of comparing two point clouds. The process is a tool and may also be used for comparison with a set of exemplars resulting in a "best of class" and a match if the data has a high enough SNR and the quantization level for the desired differences is known. Referring to FIG. 1, in step (a) a first point cloud representing a first object is chosen. In step (b) a second point cloud representing a second object is chosen. These two objects (or in many cases more than two objects) will be compared to see how well they match. In step (c), the two point clouds are azimuth (angle) aligned.

In step (d) the point clouds are quantized at a high level in preparation for translation alignment. High level quantization means sufficient to capture the translation accurately enough to accommodate the smallest anticipated voxel size for comparison (though the actual translation may be done in analog). In step (e) the point clouds are translation aligned.

In step (f), each point cloud is quantized into logical arrays having differing resolutions. This may start with the high-level quantization done in step (g), the point clouds for the two objects are compared at each resolution. This is because the best resolution to determine how well the objects match varies a great deal according to how complicated the objects are and at what level of feature the match is desired (e.g. vehicle body style versus rearview mirror). Comparison results are determined at each resolution. Generally, one of the resolution levels is determined to be the best (or at least sufficient) and that comparison result is used to decide how closely the two objects match.

The present invention dramatically reduces processing time, resources, and complexity in comparing and matching point clouds. Point clouds are 3D and anything 3D scales by the cube (size$^3$) and for arrays that are bytes (8 bits) most floating-point values are 32 bits or 4 bytes. Given the size of a point cloud it's trivial to see that a logical 3D array occupying only a single bit for each voxel is far superior as compared to a representation that is (e.g.) 32 times as large for every voxel. As with all computing, the I/O vs memory (RAM or GPU) balance comes into play as far as optimizing speed overall which includes loading up array space into processor memory or just reading from disk and caching when there's not enough memory for the entire array (possibly resulting in thrashing during demand paging). Moving memory on to a Graphical Processing Unit, for example, is part of the computational load so obviously moving a much larger array to the board will take longer. Parallel processing aspects are similar: Parallel processes divide up the memory that is shared to lightweight processes. The less memory you use to represent an object, the more you are able to take advantage of shared memory and therefore speed up computation since you are able to use more of the available kernel threads. Besides using much less space for array representation our approach may be parallelized at any scale since the logic operations are bit by bit.

FIGS. 2-7 illustrate examples of how quantization is performed. Quantization is shown after the Azimuth Alignment step because the quantization step isn't always necessary for azimuth alignment. The analog nature of the PC may be useful for getting an accurate angular alignment. (Note that the term "analog" is used herein for point clouds that include many irregularly spaced points. This is sometimes called quasi-analog, or "continuous" in integral calculus). The translation alignment preferably does use the quantized PCs for logical operations (covered in detail herein). The application of the translation correction can be applied as a continuous valued offset in the analog domain if desired.

Once alignment is within a quantization unit the analog signal isn't necessary since comparison is done at the scale of the digital representation. It is convenient to recognize the quantization step as a mechanism for storage for subsequent steps as needed and to create the PC pyramid file format (Bergen File Format: BFF).

Analog to Digital systems have existed for a long time and are necessary for many modern systems such as CDs, DVDs, and digital filters. Sound waves are digitized to create a binary representation (i.e. discrete) of a signal that is inherently analog (i.e. continuous). Analogous to the time domain signal digitization we invent the quantization of a point cloud into a digital representation at power of two-bit resolutions (e.g. $2^n=1024$ where n=10). Consider a point cloud as shown in FIG. 2.

Without loss of generality, the discussion of the algorithm implemented in three dimensions (though not limited to three dimensions) is illustrated in two dimensions for clarity.

Figure 2:
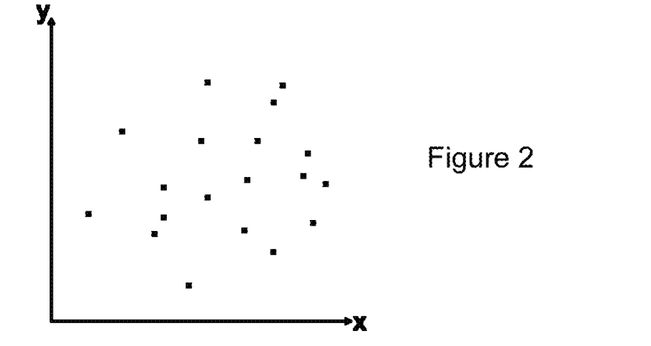
FIG. 2 is a plot illustrating the point cloud of an object.
Figure 8A:
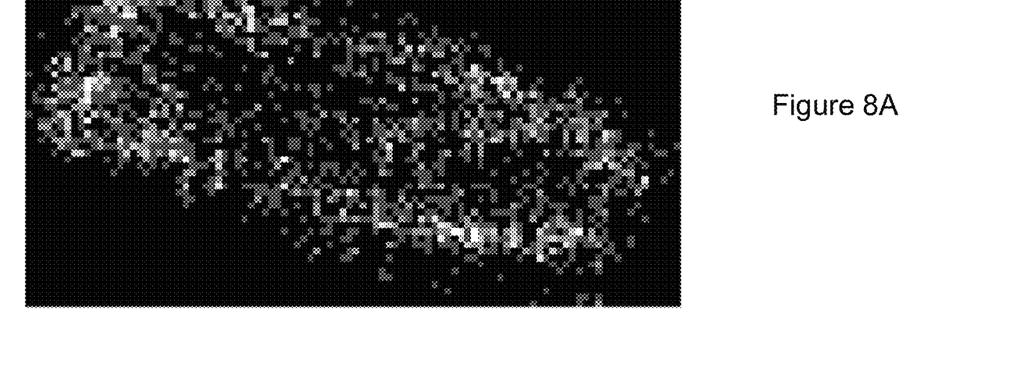
FIG. 8A shows the point cloud of an object.

FIG. 2 is a simplified plot illustrating the analog point cloud of an object, with the xy plane gridded. A more accurate point cloud, illustrating its analog nature, is shown in FIG. 8A.

Figure 3:
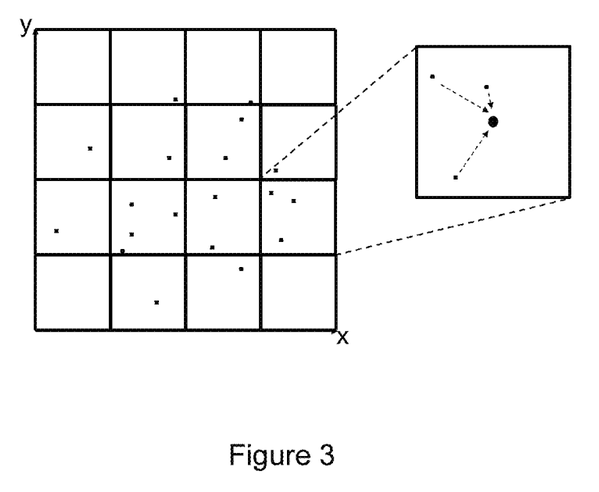
FIG. 3 is a diagram showing the step of voxelizing the point cloud of FIG. 2.

FIG. 3 is a diagram showing the step of voxelizing the point cloud of FIG. 2. The first step in quantization is to create a regular grid in the coordinate system in which the points are described. In three dimensions these cells are called voxels. To determine this grid size, we look at the extent of the point clouds and divide this extent by the desired bit resolution. For example, we can compute the maximum extent of the point clouds and divide that by the bit resolution to get the grid size. If the maximum extent is 1000 meters and we want to quantize at n=5 ($2^9=512$) then the grid size will be 1.953125 meters.

Figure 4:
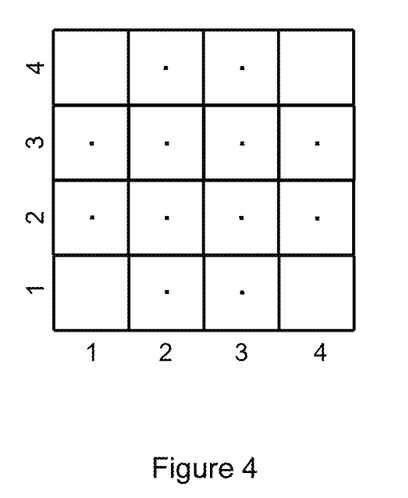
FIG. 4 is a diagram showing the step of creating a bit array from the results of FIG. 3.

FIG. 4 is a diagram showing the step of creating a bit array from the results of FIG. 3, using voxel center. For grid cells (voxels) that contain points we coalesce the points so a single point appears in the center of the voxel. At this point we locate points based upon their voxel number which is in integer (quantized) coordinates.

Figure 5:
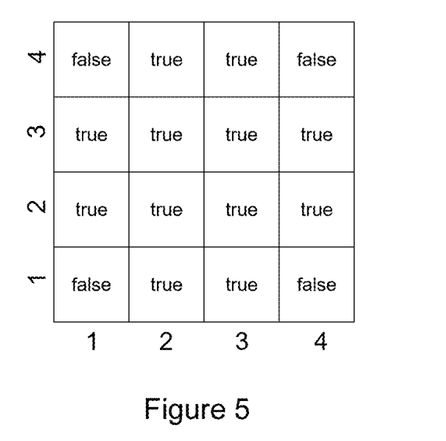
FIG. 5 is a diagram showing the data of FIG. 4 in a logic array format.

FIG. 5 is a diagram showing the data of FIG. 4 in a logic array format. In this step, a logical array is built based upon the voxelized point clouds. We create a logical array the same dimension as the voxel grid. Then we assign a value of true for each logical array element where the analogous voxel grid has a point. The algorithm uses the voxel location as an index into the logical array. All empty voxels result in a value of false in the logical array. In practice it isn't necessary to assign the false logical array locations. Most software implementations allow for logical array initialization with a value of false. FIG. 5 shows the result of forming a logical array based upon the example values in FIG. 4.

Figure 6:
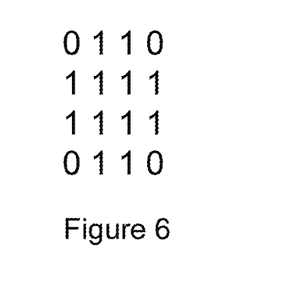
FIG. 6 is a diagram showing the data of FIG. 4 in a compact logic array format.

FIG. 6 is a diagram showing the data of FIG. 4 in a compact logic array format. The logical array representation in computer memory is optimal in the sense that each point represented in the logical array is represented by a single bit.

Figure 7:
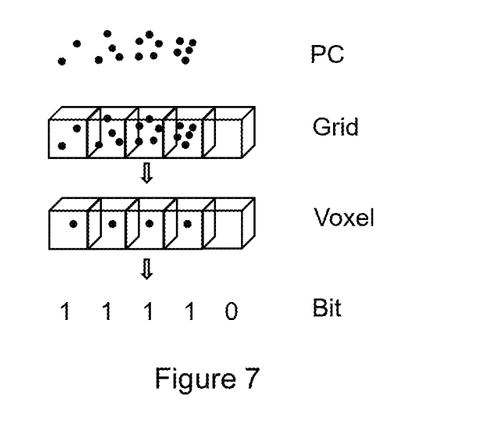
FIG. 7 is a schematic diagram illustrating the steps of FIGS. 2-6.

FIG. 7 is a schematic diagram illustrating the steps of FIGS. 2-6. At the top, a portion of the PC is shown. In the grid step, voxels are formed at the desired resolution. In the voxel step, a bit array is formed in the voxels, and in the bit step, the logic array is shown.

Point cloud pyramid (PCP)—It follows naturally that a point cloud quantized by powers of two may be represented at all levels resulting in a point cloud pyramid. Analogous to the image pyramid data structure this is useful for three-dimensional rendering where the point cloud may appear as a single point at distance and present ever-increasing resolution as the point cloud is viewed closer. The benefits of utilizing the PCP include aggregation, data reduction, speed, multi-resolution comparison.

Point clouds are preferably aligned in three dimensions before a meaningful comparison may be made. Since point clouds may be incomplete representations of an object (e.g. a single collect angle using SAR), in the embodiment described below we reference the center of mass of the point clouds for alignment in rotation and then shift the rotated points with respect to each other for translation. The rotation is done about the z axis (up) and the translation may be done in x, y, and z.

FIGS. 8A-9B are diagrams illustrating a method of preparing point cloud data for the azimuth alignment step of FIG. 1. For azimuth alignment we first form the concept of a bump map representation of the PCs. A bump map of a PC is an image representation where the 2D image represents a histogram of the 3D PC. We threshold (or limit) the maximum value in order to better retain the shape of PCs that have high dynamic range or areas of dense concentration of points. The bump map is a 2D grid with values in each grid cell representing the histogram (or sum) of points in the voxel in the vertical column occupied for that (x,y) location. The bump map is essentially an image we use to calculate statistics about the points in angle (polar coordinates).

Figure 8B:
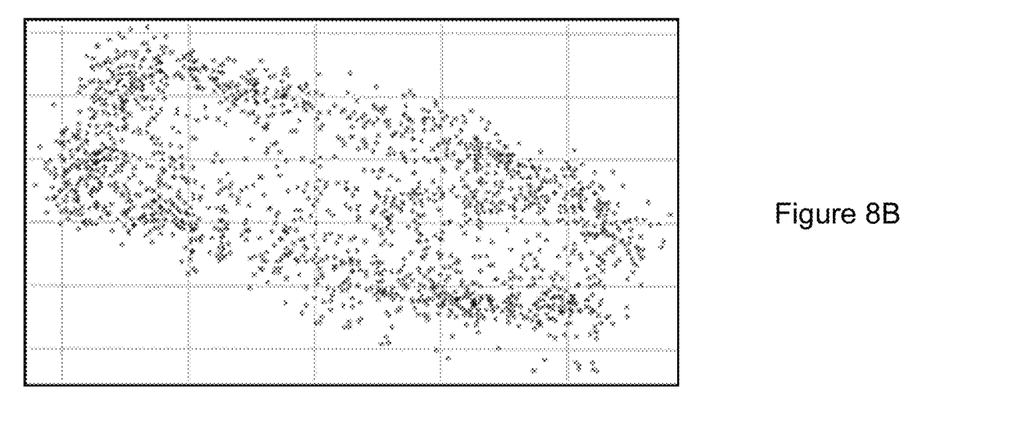
FIG. 8B shows a 2D histogram of the point cloud.
Figure 8C:
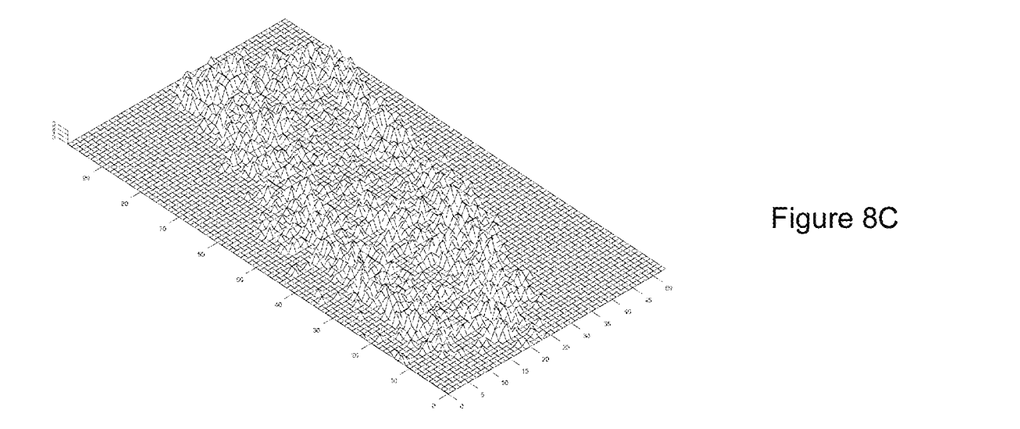
FIG. 8C shows a bump map of the point cloud.

FIG. 8A shows the point cloud of an object, FIG. 8B shows a 2D histogram of the point cloud, and FIG. 8C shows a bump map of the point cloud. Since the bump map has volume we can think of the bump map as terrain with mass that we may consider as we look along a line in the bump map. The more terrain or volume gives us more weighting in that direction as well as the extent of the mass.

Figure 9A:
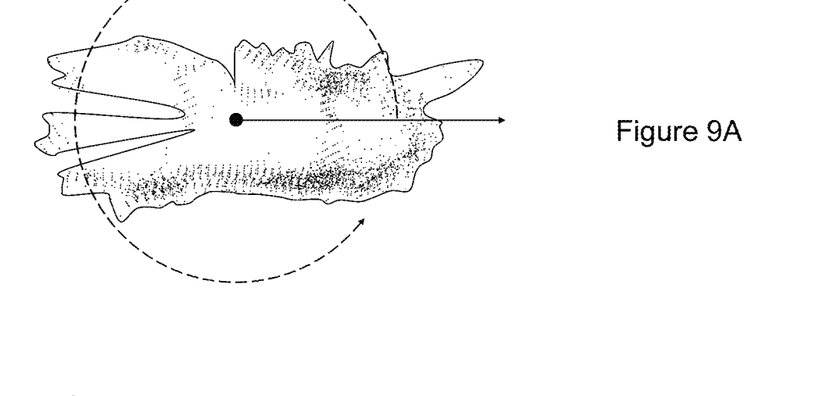
FIG. 9A shows a method of generating a weighted sum of a point cloud using a radial scan arm.

FIG. 9A shows a method of generating a weighted sum of a point cloud using a radial scan arm (the arrow). The dotted line indicates that the scan arm rotates about the center of mass. The outline on the outer edge of the point cloud illustrates the convex hull obtained from tracing each point in the point cloud along the scan arm. As we gather the point cloud shape with the scan arm, we weight the result by the number of points along the arm in each angle resulting in a mass-weighted shape curve shown in FIG. 9B. We refer to this as the characteristic signature and we use the characteristic signatures of the two point clouds to find the best angular alignment between two point clouds.

Figure 9B:
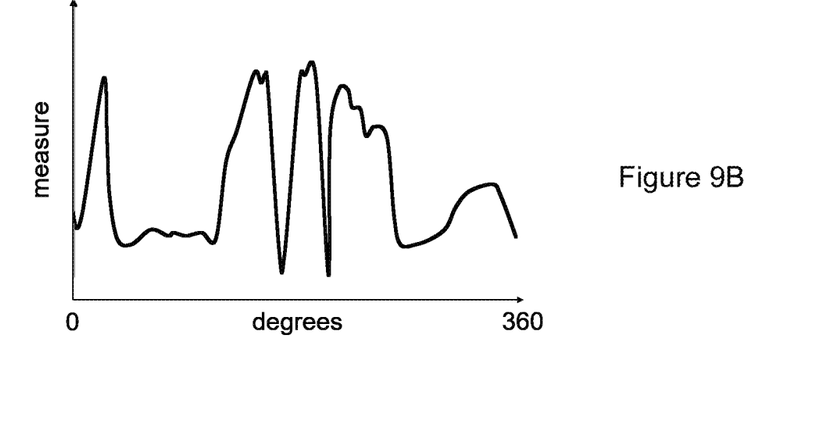
FIG. 9B is a plot showing the characteristic signature of the weighted sum in FIG. 9A.

This azimuth alignment process is analogous to rotating the point clouds with respect to each other about their respective centers of mass to optimize some metric. Our technique calculates a weighted sum as a line is scanned in angle about the center of mass. The length of the line is sufficient to encompass the entirety of the point cloud. The weighted sum is projected onto a two-dimensional plane. At each angle location the algorithm finds the most distant point along the radial arm. We then weight this by the amount of mass along the line (e.g. by using Bresenham's line algorithm to locate points that lie close to the line). We save this quantity for multiple angles, resulting in a 360 degree scan that characterizes the point cloud in a two dimensional graph, (the aforementioned characteristic signature). The characteristic signature of the weighted sum is shown in FIG. 9B.

Figure 9C:
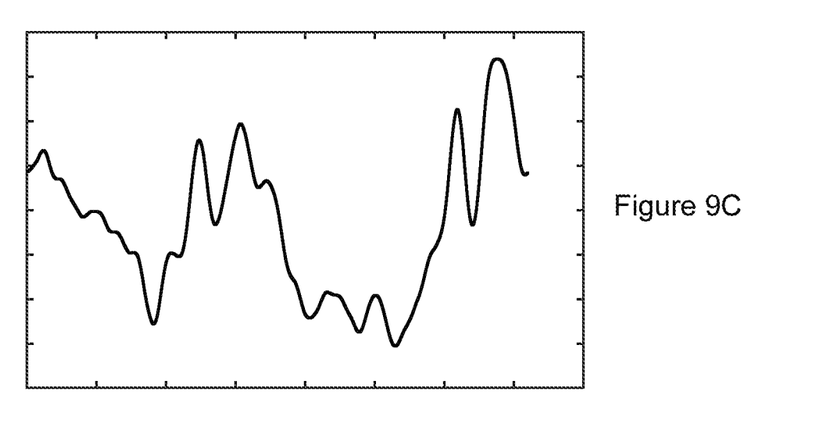
FIG. 9C is a plot showing the cross correlation of two characteristic signatures as shown in FIG. 9B.

Once characteristic signature curves have been generated for objects to be compared, the curves are cross correlated and generally the maximum value is found ideally representing the optimal alignment between two objects. FIG. 9C is a plot showing the cross correlation of two characteristic signature curves as shown in FIG. 9B (cross correlation value versus degree of rotation). This plot is correlation score (y) vs angle (degrees-x) and the peak represents the optimum angular alignment between the two point clouds under consideration. The angle where the correlation is maximum is used to rotate one point cloud with respect to the other resulting in the azimuth alignment. This maximum value represents the angle that optimizes the relative orientation of the point clouds given this metric given our energetic formulation. Ideally this alignment translates into a meaningful orientation with respect to the remotely sensed objects (e.g. two aircraft with the fuselages aligned).

Our process is not limited to the convex hull and mass. The technique uses any such angular quantity that represents a cogent aspect of the point cloud.

Figure 10:
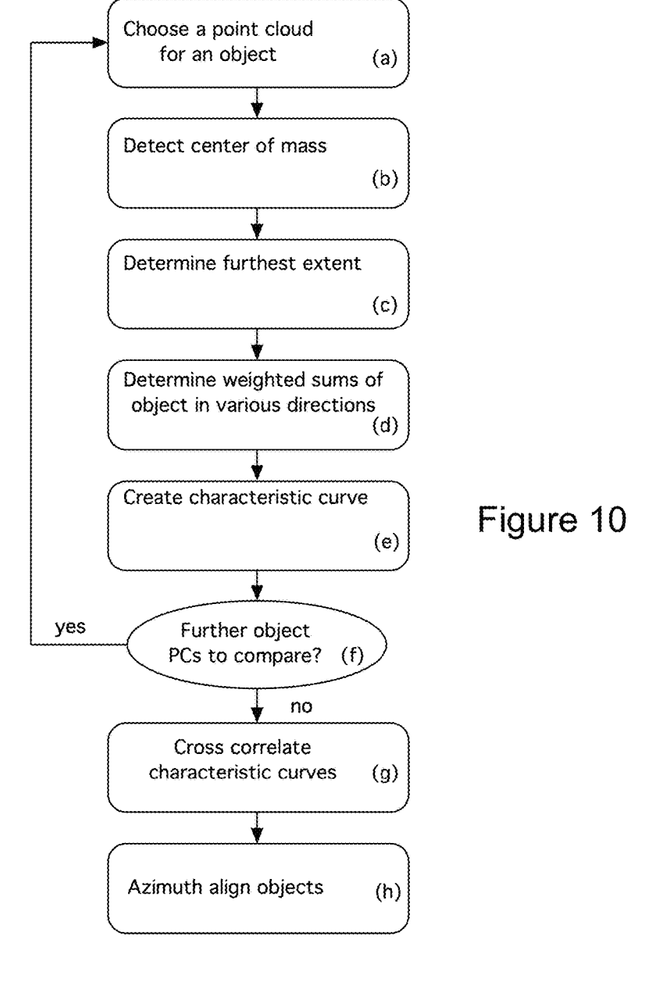
FIG. 10 is a flow diagram illustrating the process of azimuth aligning two point clouds according to the present invention.

FIG. 10 is a flow diagram illustrating the process of azimuth aligning two point clouds according to the present invention. The method is the same general technique if we incorporate other statistics along either a radial arm, diameter, or some other area-based scan to gather aspects of the point distribution. As an example, we could take the average or median distance of the points in a given area referenced from the center-of-mass or some other common location. Our example shows a mass-weighted convex hull (see FIG. 9A). The main idea is to capture the nature of the points in an angular direction and unwrap the stored statistics in a 2D graph we call the characteristic signature or characteristic shape curve (see FIG. 9B).

The characteristic shape may be used for other purposes. Here, we take the characteristic signature for each point cloud and multiply them together at offsets ranging from 0 to 360 degrees and look for the maximum value. The maximum value represents the relative angle offset of the two point clouds. We then rotate one point cloud by this angle to align with the other. In step (a), the point cloud of a selected object is chosen. In step (b) the center of mass for this object point cloud is detected. In step (c), the furthest extent of the object point cloud is found. Step (d) then determines a weighted sum along a plethora of directions to the furthest extent. Step (e) creates the characteristic signature for the object.

Step (f) performs this process for any additional selected objects (two or more objects will be compared). Step (g) cross correlates characteristic signatures to determine the best azimuth alignment for the objects. Step (h) aligns the objects.

Figure 11:
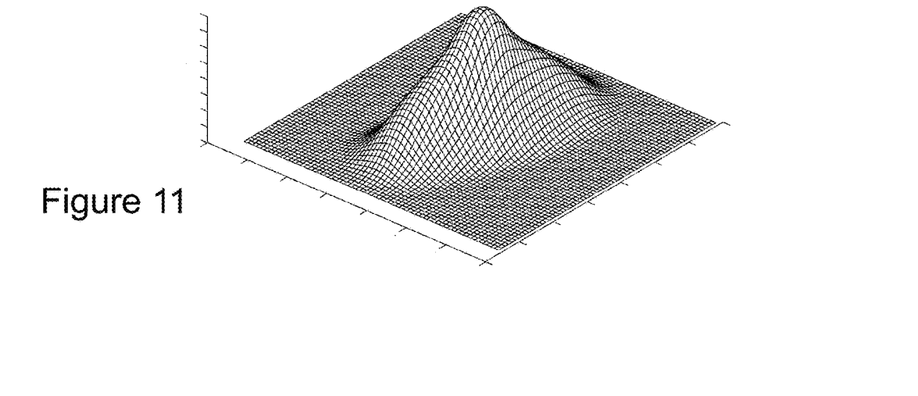
FIG. 11 is a plot illustrating a correlation surface for the translation step of FIG. 1.

FIG. 11 shows an example of how the translation step (d) of FIG. 1 is performed. Once the point clouds are aligned with respect to rotation (azimuth alignment), we then find a translation vector that maximizes the number of points in common. We use a dense quantization for this step and simply offset the logic arrays representing each point cloud with respect to each other. Without loss of generality and for illustration we display a correlation surface between two 3D logic arrays in 2D by offsetting the arrays in the (x,y) plane over a rectangular range recording the number of matches at each offset using the logical 'AND' operation. The values recorded at each offset in total results in a correlation surface whose maximum represents the offset that provides the best alignment. FIG. 11 is a plot illustrating a correlation surface. It was computed for a translation range of 64. In general, this technique is minimally done in 3D where the resulting hypersurface will have a maximum value in 3D that provides a 3D offset vector. It can be done in an arbitrary number of dimensions.

An offset is chosen, generally the offset which has the maximum value in the correlation surface of FIG. 11. We then translate one of the point clouds by this offset to align both point clouds. Note that this offset may be obtained sub-voxel and we may translate the original point cloud by a non-integer amount based upon the maximum value found in the correlation surface. Given this aligned state we may perform logical operations of interest with the logical array representations of the point clouds.

Given the theme of our method, the objects may now be compared. A typical flow for object comparison is to choose a quantization level and compare the point clouds of two objects' data arrays (using the AND function and summing). Then the quantization level is changed and the comparison is repeated several times. Generally, the quantization level that has the best probability mass separation is chosen to score the objects. Then, scores are accumulated and the best match or threshold is selected for absolute quantification.

Logic operations are simply Boolean operations between two logic arrays. Typical logical operations include AND, OR, XOR, NOT, NAND, NOR and XNOR.

Matching using the PCP—For example, to find the points that two point clouds have in common, once aligned, we may simply perform the logical AND operation between them. The resulting bits that are on (true) represent the points that the two point clouds have in common at the quantization level used. The percent match is found simply by dividing the number of matching points by the number of unique total points including both point clouds.

Spatial queries—Spatial queries may be calculated with Boolean operators. Non-matching points may be found using "NOT (A AND B)". The points with on bits may be transformed back to the point cloud coordinates system and viewed or tabulated.

Logic Trends—The behavior of logic operations between logic arrays may be graphed at different quantization levels to reveal useful trends. For example, when comparing points in common there should be a perfect match at the lowest quantization level (i.e. one voxel that contains all points in both point clouds) and a trend as the quantization level increases revealing how the point clouds differ spatially. At the highest quantization level, the percentage of matching points will decrease unless the point clouds are identical. In general, the behavior of the match curves for several object comparisons reveal aspects of the data such as the noise level with respect to the scale of the features. If the match curves never separate in a statistically meaningful way then the data is too noisy. Examining the statistics of the clusters at each quantization level is useful for understanding the quality and scale of the features in the object set. For example, calculating the covariance matrix about each quantization level for all of the object comparisons reveals a distribution. If it is multi-modal and separable then the data is of high enough resolution for meaningful comparisons at that particular scale. Statistical skew is accounted for by using well-known measurement metrics such as Mahalanobis distance. When the noise level of the data is above that of the features of interest the logical comparisons won't reveal any meaningful differences. If the data are of high enough resolution, finding the maximal separation in the curve set one can determine a set point (quantization level) that will maximize the analysis of differences at that scale. For quantization levels without appropriate statistical separation it's useful to know that the data won't reveal useful information at or above that quantization level. This sort of analysis is useful with remote sensing data sets where you don't know a priori the objects being detected regardless of scale.

The advantage of our logic array approach is that a quick, compact, and spatially meaningful logic operation may be calculated at various resolution optimizing both speed and minimizing unnecessary data volume when the scale of the problem indicates a coarser resolution than the original analog PC presentation.

Figure 12:
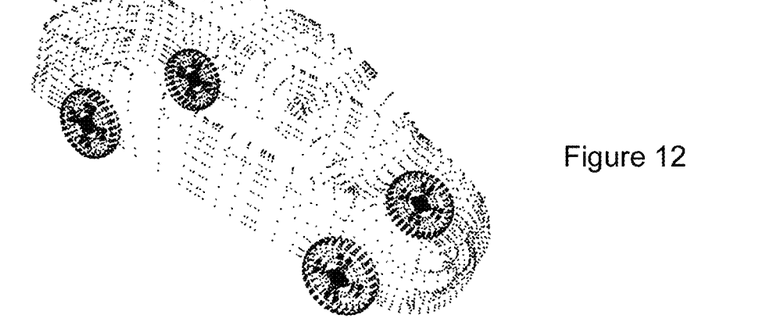
FIG. 12 is an ISO diagram of a van with CAD representation vertices.
Figure 13:
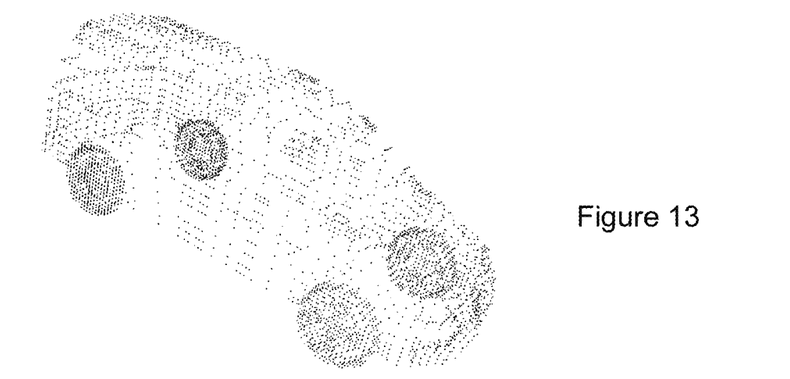
FIG. 13 is a point cloud representation of the van of FIG. 12 at a first quantization level.
Figure 14:
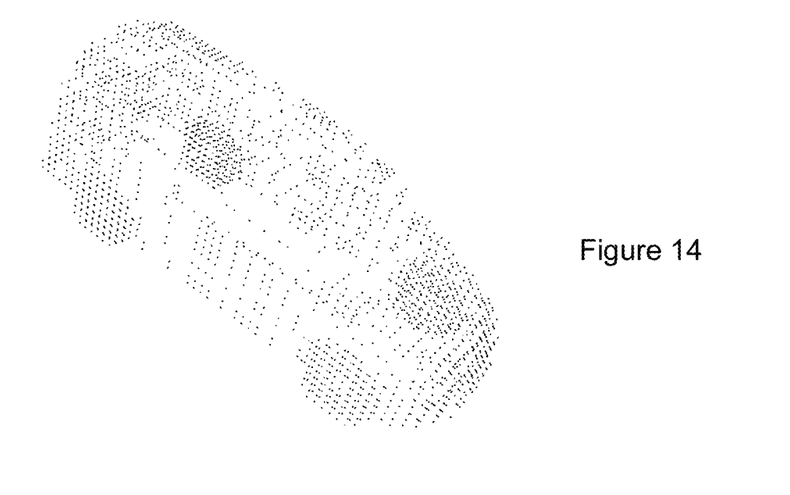
FIG. 14 is a point cloud representation of the van of FIG. 12 at a second quantization level.
Figures 15, 16:
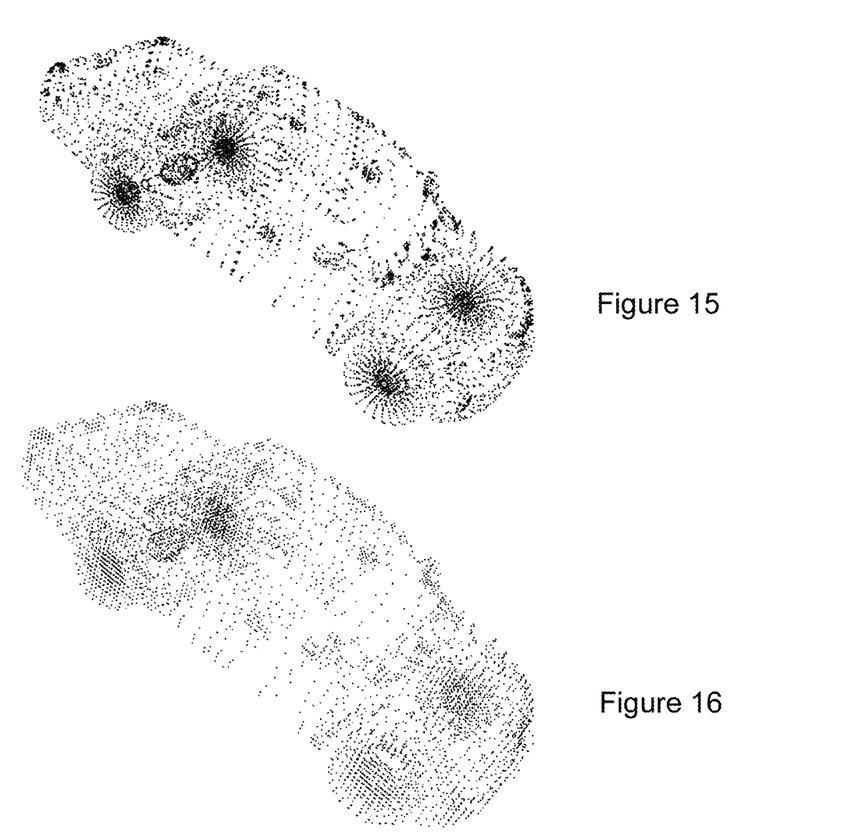
FIG. 15 is an ISO diagram of a car with CAD representation vertices.
FIG. 16 is a point cloud representation of the car of FIG. 15 at a first quantization level.
Figure 17:
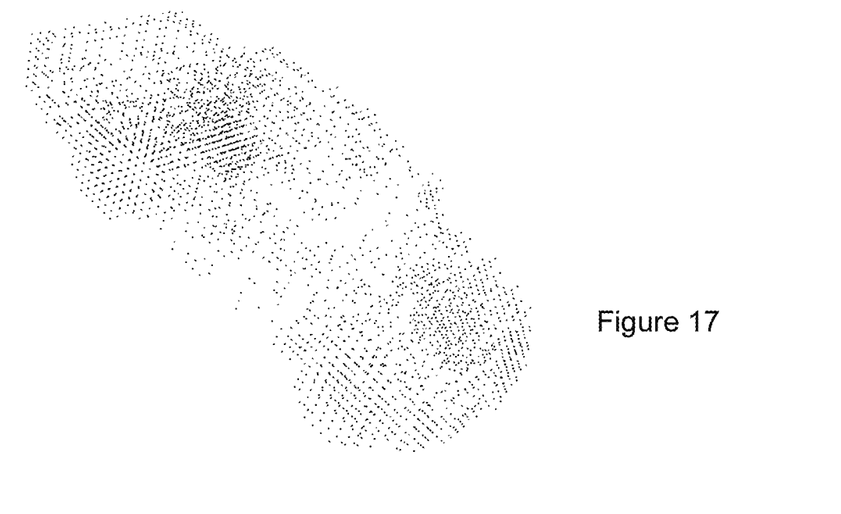
FIG. 17 is a point cloud representation of the car of FIG. 15 at a second quantization level.

FIGS. 12-18 illustrate a first example of the present invention, comparing a van and a truck based on CAD models. To illustrate how the comparator performs we use two sets of points: one representing a van and another a truck from CAD models of these vehicles (noiseless). FIGS. 12-14 show the van points in original, 128, and 64 quantization levels respectively. FIGS. 15-17 similarly show the representations for the truck. The two automobiles occupy about the same bounding box. The major feature difference is the truck bed. The body shape accounts for smaller deviations. From looking at FIGS. 12-18, a low quantization level will easily discriminate between the two (i.e. the relative size of the truck bed space or quantization level of 8 or 16).

For this example, we follow the process flow given in FIG. 1. We do this for nine quantization levels and look at the results to demonstrate both the utility of the method and its diagnostic capabilities. Also, the simplicity of using logic operators is easily understood and simple to perform.

Figure 18:
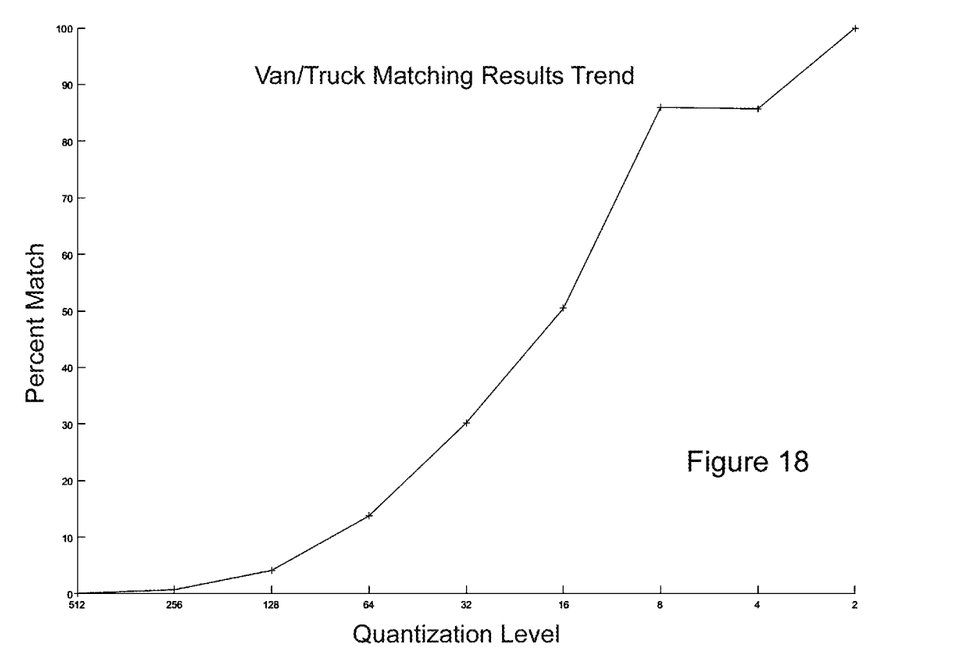
FIG. 18 is a plot illustrating a comparison response curve at various quantization levels for the vehicles of FIGS. 12-17.

First before each comparison we follow the quantization and alignment steps shown in FIGS. 2-11. It is important to have a good alignment between two objects for the comparison using logical arrays to be meaningful. Given two aligned objects we compute the PC pyramid for the van and truck starting with 1024 levels down to 2. We then "and" the logic arrays together and count the matches. We compute the percentage match by computing the ratio of matches to total number of unique points. FIG. 18 shows the result.

FIG. 18 is a plot illustrating a comparison response curve at various quantization levels for the vehicles of FIGS. 12-17. We plot the percentage match at all of the quantization levels (not just the two shown in the figures). At the lowest quantization level, we have 100% match as expected because all of the points fit into one large voxel. As we increase the quantization level, we start to see differences and at the highest level (1024) the on bits in the logical array representations don't overlap. Note the "shelf" at quantization level 8 in FIG. 18. This represents where the truck bed is discriminated and the remaining differences are due to essentially oversampling. The utility of the trend graph is to note what quantization level is desired for comparison. The ends of the curve (high and low quantization) are only for illustration here. In practice data sets must have high enough quality (i.e. noise level below the size of features of interest) for differences at scale to be resolved. Determining automobile body types requires less quality than detecting features such as rear-view mirrors.

Our next example, illustrated in FIGS. 19-23, uses actual SPC objects. This data set was formed by Synthetic Aperture Radar Point Cloud (SPC: SAR PC) using a patented technique for forming 3D point clouds from SAR data (U.S. Pat. No. 9,417,323 B2). We have gathered a set of point clouds representing the objects that are automobiles in a parking lot. The data is noisy and presents a challenging use case for our algorithm and demonstrates its efficacy.

We take a known automobile, the Chevrolet HHR LT, and take its SPC representation and use our approach to compare it to other vehicles in the lot for similarity. FIGS. 19-22 show the point cloud representations for four of the known vehicles. We know that at some scale we should be able to distinguish our candidate vehicle from the others as long as the noise level is low enough. The noise level has to be lower that the scale of the difference between the features on the automobiles. For example, at a quantization of level of 32 we are able to keep details like rear view mirrors. We really only need a quantization of 16 or even 8 to distinguish automobile body types.

Figure 19:
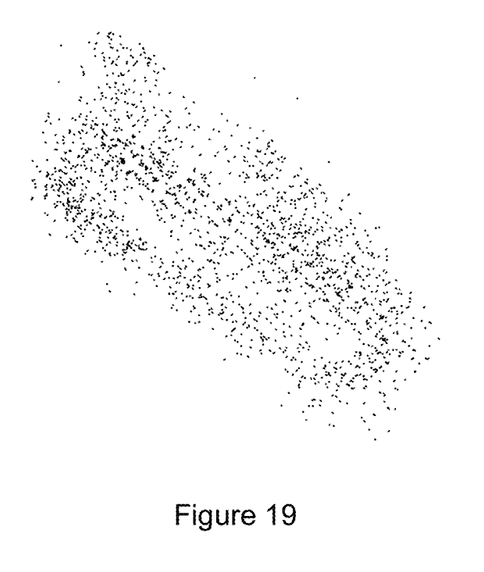
FIGS. 19-22 are points clouds of various vehicles.
Figure 20:
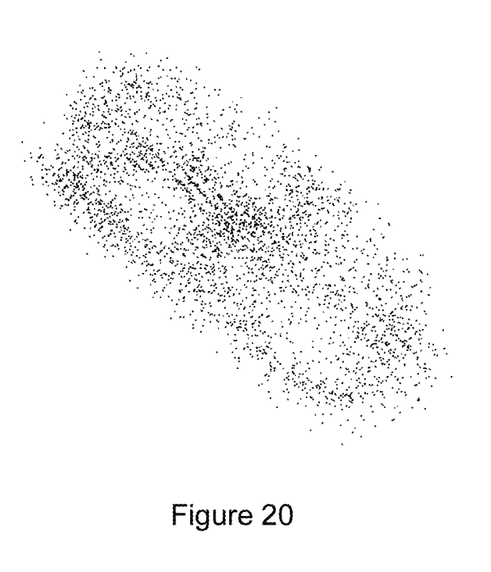
Figure 21:
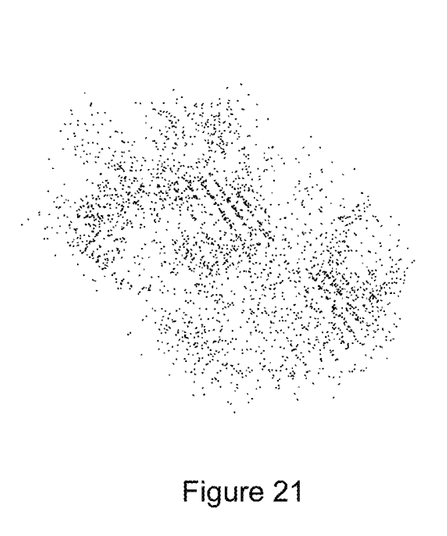
Figure 22:
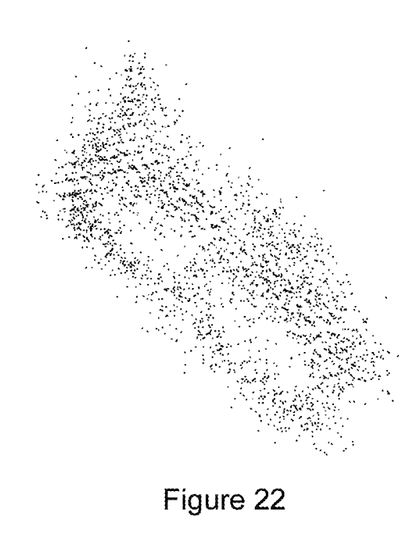

For a demonstration of the discriminating power of our comparator we took individual objects from the public release data collected in the Wide-Angle SAR Data for Target Discrimination Research (See Dungan et al. "Wide Angle SAR Data for Target Discrimination Research", Algorithms for Synthetic Aperture Radar Imagery XIX, Proc. SPIE 8394, 8394-21, (2012)). The study consisted of collects of several parking lots with known vehicle locations and types. We selected three different vehicle types and use point cloud representations of the following objects (left: reference tag name):

fcarA1—Chevrolet Impala LT
fcarA2—Chevrolet Impala LT
fcarB2—Mitsubishi Galant ES
fsuv3—Toyota Highlander
fsuv5—Toyota Highlander
mcar2—Chevrolet HHR LT (basis for comparison)
mcar3—Chevrolet HHR LT
mcar5—Chevrolet HHR LT
msuv5—Pontiac Torrent FIGS. 19-22 are point clouds of four of the above for illustrative purposes. These four figures illustrate the nature of the point cloud data. Without ground truth it is difficult to visually determine what the objects are. All views are in iso view looking down at the right front of each automobile. FIG. 19 is a SPC representation of mcar2, a Chevrolet HHR LT. The other vehicles are compared to this PC. FIG. 20 is fcarA1, a Chevrolet Impala LT, FIG. 21 is fsuv-3, a Toyota Highlander, and FIG. 22 is mcar3, a Chevrolet HHR LT. From FIGS. 19-22 it is apparent that the noise level and point distribution make it hard to determine visually what kind of automobile the SPC represents or even to be certain that it is an automobile.

The process of FIG. 1 is performed for each point cloud comparison—quantization, azimuth alignment, translation alignment, logical operation, and results. Table 1 is the tabulated data from the logical operation step: comparing the logic array representations of the automobile point cloud representations at quantization levels 8, 16, 32, and 64.

TABLE 1

| Percent Match at Q: | 64 | 32 | 16 | 8 |
| --- | --- | --- | --- | --- |
| fcarA1 | 8.7364 | 32.4709 | 62.7628 | 77.4194 |
| fcarA2 | 7.3967 | 29.7558 | 53.6585 | 65.5738 |
| fcarB2 | 8.7092 | 30.8937 | 56.7857 | 70.9091 |
| fsuv3 | 4.4420 | 18.0788 | 39.9132 | 54.9451 |
| fsuv5 | 2.7864 | 13.3574 | 37.9679 | 50.5882 |
| mcar3 | 11.1702 | 44.2280 | 76.5079 | 84.1270 |
| mcar5 | 10.4679 | 39.9613 | 69.5783 | 85.2459 |
| msuv5 | 3.2792 | 15.7177 | 38.7800 | 55.5556 |

Figure 23:
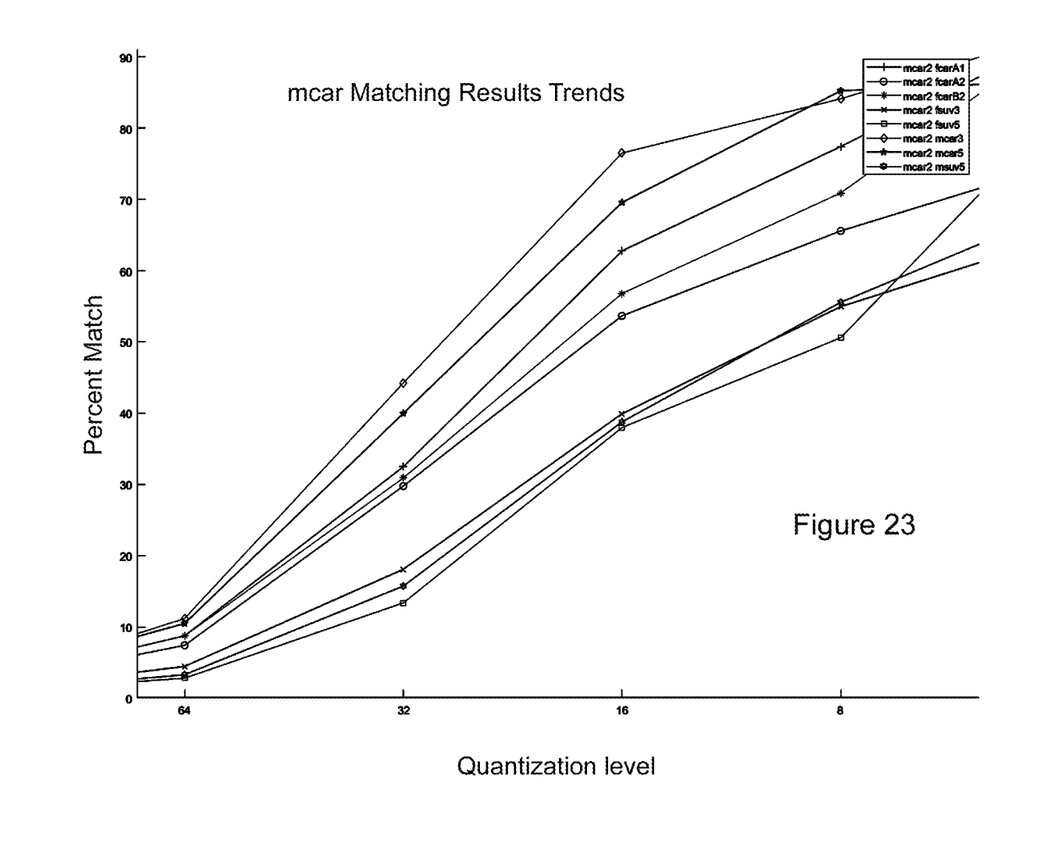
FIG. 23 is a plot illustrating a comparison response curve at various quantization levels for the vehicles of FIGS. 19-22.

FIG. 23 is a plot illustrating a comparison response curve at various quantization levels for the vehicles, including those shown in FIGS. 19-22, and shows the Table 1 data in graphical form. Of note in FIG. 23 is the grouping of automobile types. Note that the two highest matches over all quantization levels are mcar3 and mcar5 which are both Chevrolet HHRs. Next lower in match is the Chevrolet Impala group of three. And at the bottom are the three SUVs. This study demonstrates the ability to match the "best of" a group with a candidate point cloud. FIG. 23 also illustrates the ability to determine a working quantization level. Quantization level 32 works well in this example, because upon inspection it creates the greatest spread and clustering of the automobile's types. In addition, with unknown objects a similar graph against exemplars can show at what level of quantization the differences appear or are greatest. As the noise level rises in the point cloud data, the clustering of automobile types will disappear. It is useful to know if a dataset is of sufficient quality in order to make a comparison by producing a quantization level trend graph for all of the objects under consideration. If a suitable quantization level exhibits enough clustering or separability then that level may be used as a set point to reduce computational volume.

While the exemplary preferred embodiments of the present invention are described herein with particularity, those skilled in the art will appreciate various changes, additions, and applications other than those specifically mentioned, which are within the spirit of this invention. For example, the techniques described herein may be used in total or in part to accomplish such things as bore sighting and partial matching. Bore sighting is a technique where you determine the major axis of an object. For example, traditional bore sighting refers to aligning a rifle or other firearm so that you are able to adjust the bore sight such that when aimed at a target at a certain range the projectile or kinetic energy weapon hits the bullseye on a target. For point clouds if an object has a major direction or axis, we may use the characteristic signature to find the bore sight. Partial matching may be performed by finding a boresight and dividing the point cloud into quadrants, octants or other portions specified by some angular separation. Then partial object point clouds may be compared with the pieces of the partitioned point cloud to find a best match. This is helpful because the alignment of partial point clouds against full exemplars is problematic.

Of course, entering the digital signal processing realm (DSP) a plethora of options await the eager data scientist once the point cloud has been digitized. Borrowing from tomography in medical imaging it's possible to perform techniques such as the discrete Fourier Transform (DFT) and subsequent filtering to manipulate point cloud data such as smoothing and other typical DSP filtering.

What is claimed is:

1. The method for comparing point cloud data for objects comprising the steps of:
   (a) selecting a first analog point cloud representing a first object and a second analog point cloud representing a second object;
   (b) azimuth aligning the first and second point clouds;
   (c) after step (b) translation aligning the first and second point clouds;
   (d) generating regularly spaced logical arrays at a first resolution based upon the first and second point clouds;
   (e) comparing the logical arrays generated in step (d) and generating a first-resolution comparison response value;
   (f) generating regularly spaced logical arrays at a second resolution based upon the first and second point clouds;
   (g) comparing the logical arrays generated in step (f) and generating a second-resolution comparison response value;
   (h) selecting one of the comparison response values; and
   (i) generating a comparison result for the first object and the second object based upon the selected response value.

2. The method of claim 1 further comprising the steps, performed before step (h), of:
   (j) selecting a third point cloud representing a third object; and
   (k) repeating steps (b) through (i) for the first and third point clouds.

3. The method of claim 2, further including the step of:
   (l) determining whether the second object or the third object is a better match for the first object based upon the comparison results.

4. The method of claim 3, further comprising the steps of:
   (m) before step (h), repeating steps (e) and (g) through (i) for the second and third point clouds; and (n) determining how well each object matches each of the other objects.

5. The method of claim 1, further comprising the steps, performed before step (h), of:
   (o) generating regularly spaced logical arrays at a third resolution based upon the first and second point clouds,
   (p) comparing the logical arrays generated at the third resolution level, and
   (q) generating a third comparison response value.

6. The method of claim 5, further including the step of:
   (r) before step (h), forming and displaying a curve based on the comparison response values.

7. The method of claim 6, further comprising the steps performed before step (h) of:
   (s) selecting a third point cloud representing a third object; and
   (t) repeating steps (b) through (i) for the first and third point clouds; and
   (u) forming another curve based on the comparison response values from steps (s) and (t).

8. The method of claim 7, further comprising the step of:
   (v) in step (h) examining the separability of the curves.

9. The method of claim 1 wherein steps (e) and (g) are accomplished by performing logical AND functions between arrays and counting true results.

10. The method of claim 4 wherein steps (e), (g), (l) and (n) are accomplished by performing logical AND functions between arrays and counting true results.

11. The method of claim 6 wherein steps (e), (g), and (r) are accomplished by performing logical AND functions between arrays and counting true results.

12. The method of claim 1 wherein step (b) includes the steps of:
   (b1) finding a center of gravity of each point cloud;
   (b2) generating weighted sums of each point cloud by determining the number of points along various angular directions from the center of gravity;
   (b3) generating a characteristic signature of each point cloud based upon its weighted sums;
   (b4) cross correlating the characteristic signatures; and
   (b5) choosing the angular alignment between the point clouds based on the results of step (b4).

13. The method of claim 1 wherein step (c) is performed after step (d) and includes the steps of:
   (c1) offsetting the logical arrays various amounts by translating one logical array with respect to the other;
   (c2) performing logical AND functions between arrays and counting true results after each offset; and
   (c3) determining the offset that maximizes the results of step (c2).

14. The method of claim 1 wherein steps (d) and (f) are performed by voxelizing the point cloud and then setting each voxel containing points as "true" in a logical array.

15. The method of claim 1 wherein, prior to performing step (b), the first and second point clouds are quantized at a level representing a selected spatial accuracy.

16. The method of claim 10 wherein, prior to performing step (b), the first and second point clouds are converted to a bump map.

17. Apparatus for comparing point cloud data for objects comprising: means for uploading into computer memory a first analog point cloud representing a first object and a second analog point cloud representing a second object; a user display; and a processor configured to accomplish— azimuth aligning the first and second point clouds; quantizing the first and second point clouds; translation aligning the first and second point clouds after the first and second point clouds have been azimuth aligned; generating multiple regularly spaced logical arrays at multiple resolutions based upon the first and second point clouds; comparing logical arrays based on the first point cloud to logical arrays based on the second point cloud at various resolutions and generating response values at the various resolutions; selecting a comparison response value; and generating a comparison result for the first object and the second object based upon the selected response value.

18. The apparatus of claim 17 wherein the processor is further configured to display response values on the user display and to accept user input to select the comparison response value.

\* \* \* \* \*